Figure 1:
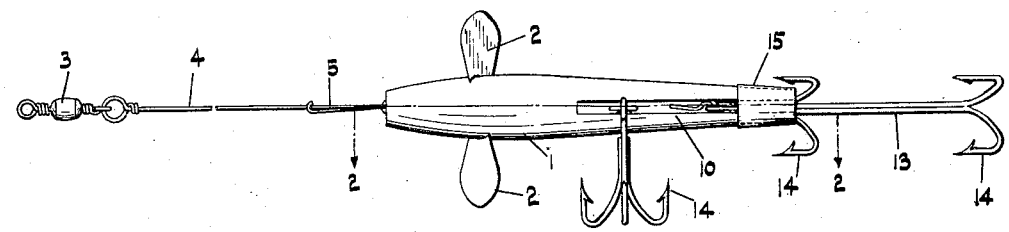

April 29, 1930.  C. T. PFLUEGER  1,756,260
ARTIFICIAL MINNOW
Filed June 24, 1925

INVENTOR.
CHARLES T. PFLUEGER.
BY
ATTORNEY.

Patented Apr. 29, 1930

1,756,260

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

ARTIFICIAL MINNOW

Application filed June 24, 1925. Serial No. 39,241.

This invention relates to artificial minnows for use as fish lures, of the type in which there is provided a rotating or spinning substantially fish-shaped body portion carrying a plurality of hooks which are secured to a wire member or carrier enclosed within the body portion, some of the hooks projecting rearwardly from the tail of the body, while others are located at a midway point on opposite sides of the bait body.

It is the object of the invention to devise a fish lure of this type which means whereby the rear hooks may not become detached from the centrally located carrier or the body itself by the struggles of the fish.

The invention is illustrated in one form, it being obvious that changes and modifications may be made within the scope of the invention as set forth in the claim appended hereto.

Figure 2:
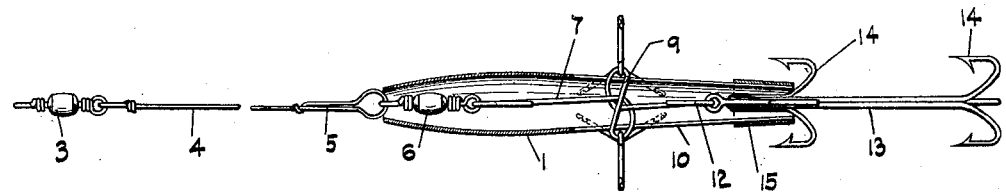

In the drawings:

Figure 1 is a side elevation of the fish lure showing one embodiment of the invention; and Figure 2 is a longitudinal section taken through the body of the bait on the line 2—2 of Figure 1.

The numeral 1 indicates the bait body, which is preferably cigar-shaped to simulate the form of a fish. The body is hollow and open at both ends, being constructed from metal and having a pair of inclined fins 2 located near the head of the body designed to cause the body to rotate as it is drawn through the water.

The line is attached to a swivel 3 which is attached to one end of a wire leader 4, the other end of which is formed with loop-clasp 5, the rounded portion of which is located at the front end of the bait body and is somewhat larger than the opening in the bait body. Within the bait body and secured by the loop is a second swivel 6 which is, in turn, connected to a wire hook carrier 7. The central portion of the carrier is bent to form an 8-shaped portion 9, the outer extremities of which project through slots 10 at opposite sides of the bait body at approximately its central point. For the purpose of assembling the lure, the slots extend to and are open from the tail end of the bait body.

The tail end of the hook carrier 7 is formed with a catch 12 in which is carried the eye of a rearwardly extending hook 13 which carries at its upper end a set of barbs 14 which project from the open tail end of the bait body, and at its rearward extremity a further set of barbs 14. In order to prevent the hook 13 from being detached from the carrier 7 by the struggles of the fish, a ring or ferrule 15 is slipped over the tail end of the bait body and serves to close the slot and maintains the hook in the correct position extending rearwardly of the body. In former constructions of this type, the hook 13 could be displaced and interfered with the spinning action of the bait, and could also become disconnected from the centrally located carrier. The ferrule 15 also serves as a brace for the bait body and strengthens it, and may be made of a contrasting color from the body, affording an added attraction for fish. The loop clasp 5 prevents the pulling out of the hooks and harness from the body, which, in combination with the ferrule 15, will insure against accidental disengagement of the hooks.

In order to disconnect the various parts of the lure, the snap 5 is first unfastened and removed from the swivel 6. The ferrule 15 is then removed and the carrier and its connected parts may be withdrawn from the bait body, the loops 9 passing out at the end of the slot 10. It may be reassembled in the reverse order.

What is claimed is:

A fish lure comprising a body open at both ends, a leader at the forward end of the body, a hook carrier located within the body and attached to the leader, an obstruction on the leader adapted to engage the forward end of the body to prevent forward movement of the body over the leader, the body having a slot opening from the tail end thereof, a projection upon the carrier passing through the slot, a hook carried by the projection, rear hooks removably attached to the carrier and passing out through the tail end of the body, and an inextensible ferrule surrounding the tail end of the body and abutting said rear hooks to prevent rearward or lateral movement of said bait body.

CHARLES T. PFLUEGER.